Patented Oct. 14, 1952

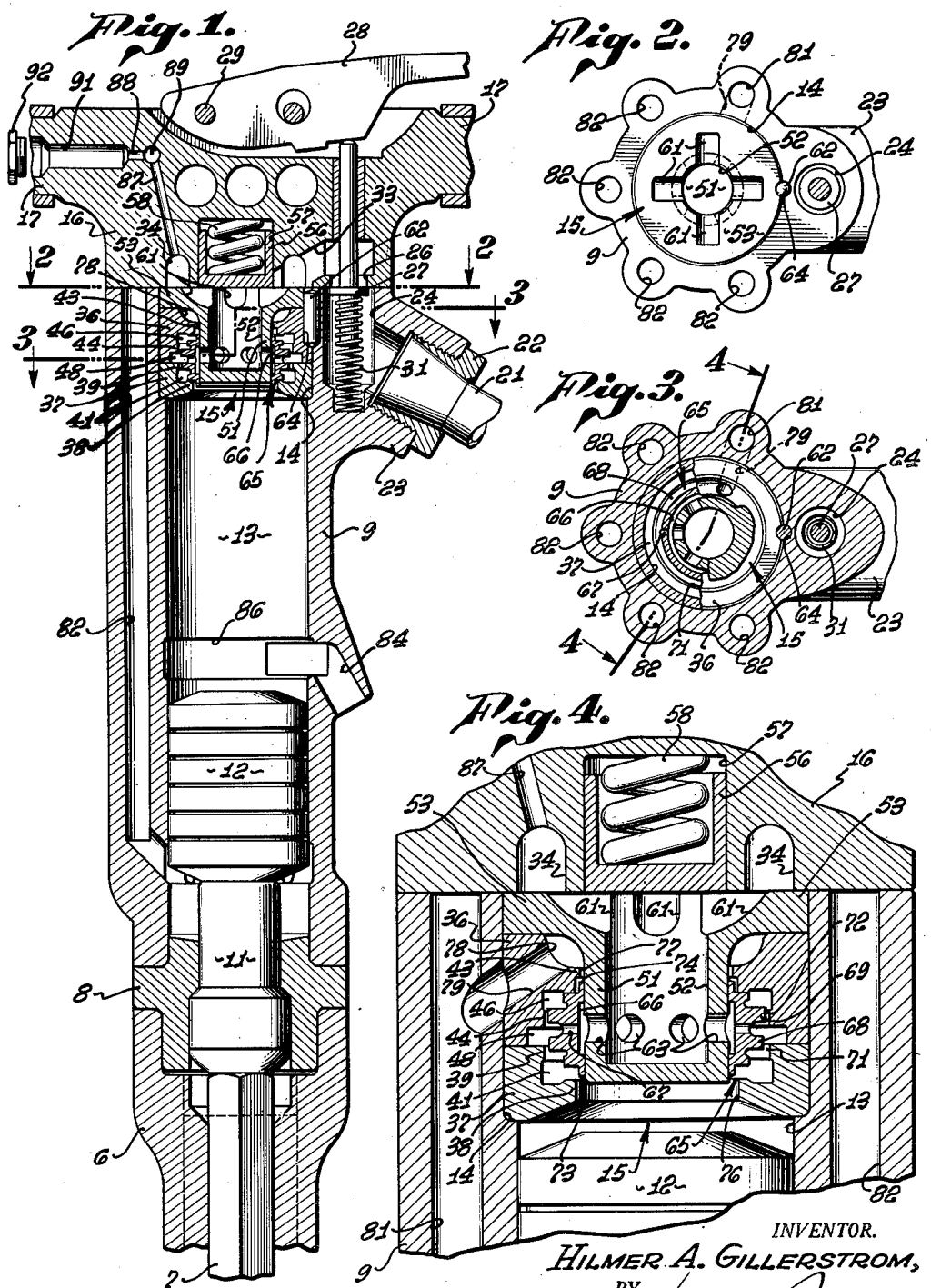
INVENTOR.
HILMER A. GILLERSTROM,
BY
ATTORNEY.

2,613,646

UNITED STATES PATENT OFFICE 2,613,646

VALVE MECHANISM FOR PNEUMATIC TOOLS

Hilmer A. Gillerstrom, Arcadia, Calif., assignor to Independent Pneumatic Tool Co., Chicago, Ill., a corporation of Delaware Application March 25, 1949, Serial No. 83,339

5 Claims. (Cl. 121—29)

The present invention relates to valve mechanisms in general and particularly to a valve mechanism for pneumatic tools. More specifically the invention comprises an automatically reciprocating valve mechanism particularly adapted for incorporation into pneumatic drills.

Pneumatic drills are today widely used in mining operations. One type comprises the reciprocating drill in which the drill proper is driven into the surface of the work by repeated high frequency blows delivered by an air-actuated piston. Acting under substantial air pressures in conventional constructions it is possible to deliver as many as 20 blows per second. Power is obtained from the air under pressure by directing it against the force-delivering piston during each working stroke and then cutting it off to enable the piston to return to its initial position. The accurate and complete control of the direction of air flow is all-important and requires an extremely sensitive yet rugged valve construction capable of reciprocating at extremely high frequencies and of sealing off air under high pressures. A sluggishly operating valve seriously reduces the effectiveness of the pneumatic tool and can even render it inoperative. A valve, however, which is positive in its operation, rapid in its acceleration, and completely satisfactory in its sealing action, insures maximum operative effectiveness. It is in such a valve that the present invention lies.

With an appreciation of the problems characterizing the field of pneumatic tools, and particularly pneumatic drills, it is an object of the present invention to provide a new and improved valve mechanism for such tools.

It is another object of the invention to provide a valve mechanism for pneumatic tools so constructed that the actuating fluid is available at full pressure directly at the point of valve operation without the inter-position of pressure-reducing and force-restricting passages to provide a positive acting, rapidly accelerating valve.

A further object of the invention is to provide a valve mechanism for pneumatic tools characterized by the proximity of a large volume of air under pressure with respect to the distributing reciprocating valve and which eliminates the tortuous, air-conducting passages commonly present in conventional constructions which inherently effect losses of air pressure and velocity.

Still another object of the invention is to provide a new and improved valve mechanism for pneumatic tools in which a reciprocating slidable sleeve valve slides with a floating action upon a cylindrical guide formed interiorly as a pressure chamber to supply air directly to the valve.

Still another object of the invention is to provide an improved valve mechanism in which a cylindrical pressure chamber provided with radial ports slidably seats upon its exterior a reciprocating sleeve valve provided with radial ports through which air passes in all of its positions.

A further object of the invention is to provide a pneumatic tool in which a reciprocatory sleeve valve slidingly mounted upon the cylindrical exterior of the initial valve pressure chamber is displaced longitudinally between sealing positions by air under pressure from said chamber and by air placed under pressure by the driven tool.

These and other more specific objects will appear upon reading the following specification and claims and upon considering in connection therewith the attached drawing to which they relate.

Referring now to the drawing in which a preferred embodiment of the invention is disclosed:

Figure 1 is a partial longitudinal section through a pneumatic drill involving a valve mechanism constructed in accordance with the present invention;

Figure 2 is a transverse section upon the line 2—2 of Figure 1 and shows the central pressure chamber from above;

Figure 3 is a transverse section upon the broken line 3—3 of Figure 1; and

Figure 4 is a section upon the line 4—4 of Figure 3 and illustrates the position of the valve with the piston at the upper end of its return stroke.

Referring now again to the drawing, the upper end of a rock drill is shown in vertical section in Figure 1 and is seen to comprise a front head 6, carrying a longitudinally reciprocating drill proper 7, connected through an intermediate hammer seat 8 to a cylinder casing 9. Connector 8 is centrally bored and seats a longitudinally movable hammer 11 abutting the inner end of the drill proper 7 and adapted to be struck at its opposite end by a piston 12 longitudinally slidable in air-tight relationship in a cylinder chamber 13. The latter is counterbored at 14 at its open upper end and seats a valve assembly indicated generally by the reference character 15. A backhead 16 abuts the upper or inner end of the cylinder casing 9 and serves as the closure for the chamber 13. Its laterally extending portions 17 serve as handles by which the tool may be held and guided. Cylinder casing 9 and backhead 16 are provided with air passages, chambers, and air controls so that air under pressure will enter cylinder chamber 13 to exert a downward force upon the piston 12 and drive it against the hammer 11 and through the latter exert a cutting force upon the drill proper 7.

The heart of the flow-controlling means comprises the valve mechanism 15 which controls the intermittent flow of air into the chamber 13. On its way to the valve mechanism air under pressure is conducted into the tool through a swiveled air inlet 21 retained by a nut 22 threaded in an internally bored spud 23 opening into a valve chamber 24. The port 26 at the upper end of the valve chamber is normally closed by a valve 27 the stem of which extends upwardly in sliding relationship through the backhead 16 and into position to be contacted by the manually operable lever 28. The latter is pivoted at 29 and is adapted to be forced downwardly by the hand of the user which encircles the adjacent handle 17. The valve is normally urged into its port-closing position by a coil spring 31 positioned in the chamber 24.

Above valve 27 the port 26 connects to a passage 33 leading to a circular channel 34 having an open lower side facing the valve mechanism 15. With the valve 27 in its open position as depressed by the hand lever 28 air under pressure is admitted and directed into the circular channel 34. With the valve 27 closed the passage of air is prevented.

The generally indicated valve mechanism 15 is positioned, as previously stated, within the counterbore at the upper end of cylinder chamber 13. The mechanism comprises a valve chest formed of upper and lower body parts, indicated respectively by the reference characters 36 and 37. Parts 36 and 37 are cylindrical and abut each other, lower part 37 resting upon the shoulder at the lower end of the counterbore 14. Chest part 37 is formed interiorly with inwardly extending circular ridges or flanges 38 and 39 forming between them, in cooperation with the valve to be described, a chamber 41 which will be referred to as the lower pressure chamber. Similarly, upper part valve chest 36 is formed with an upper inwardly extending circular flange or ridge 43 and an intermediate circular flange or ridge 44 which between them form, with the cooperation of the valve to be described, an upper pressure chamber 46. Between adjacent shoulders or webs 39 and 44 chest part 36 is interiorly grooved as to form an intermediate pressure chamber 48 located between chambers 41 and 46. Inner ridges or flanges 39 and 44 preferably have the same inner radial extension and outer flanges or shoulders 38 and 43 may also be of substantially the same radial extent, although this last is not essential.

A cylindrical valve guide 51 extends downwardly within the valve chest providing an interior or central pressure chamber 52 closed at its lower end, open at its top, and provided with a radially extending flange 53 positioned between upper chest part 36 and the backhead 16. To insure a tight fit of the parts and to allow for manufacturing tolerances a takeup is provided comprising a cup member 56 slidable in a cylindrical recess 57 in backhead 16 and urged downwardly by a strong coil spring 58. The bottom of cup member 56 contacts and exerts a force upon the flange 53 of the guide member 51 so that the chest parts are forced together and against the shoulder at the bottom of the counterbore 14 in which they are positioned.

A plurality of radial, downwardly and inwardly inclined grooves 61 in the top face of guide flange 53 connect the central pressure chamber 52 with the downwardly opening circular channel 34 in the backhead so that air under pressure entering from the conduit 21 and passing the valve 27 will be conducted through the conduit 33, channel 34, directly into the central chamber. The latter is provided with laterally extending ports 63 which connect, as will be described, with the intermediate pressure chamber 48 previously described. A key pin 62 extends in a slot 64 formed by cooperating apposed grooves in the counterbore 14 on one side and the flange 53 and valve chest part 36 on the other to fix the parts relative to one another.

The valve member is indicated generally by the reference character 65 and comprises a cylindrical sleeve slidably mounted upon the exterior of guide casing 51 for vertical displacement between the inner faces of the chest end flanges 38 and 43. The valve 65 is, in its general configuration, a sleeve or ring but is interiorly and exteriorly contoured as to cooperate with maximum effectiveness with the central pressure chamber 52 and with the pressure chambers which it forms with the valve chest parts 36 and 37.

The inner surface of the slidable valve 65 is provided with a circular channel 66 of sufficient width that it is open to the lateral ports 63 of the guide casing 51 in all positions of the valve. Lateral or radially extending ports 67 in the valve 65 itself open interiorly into the channel 66 and exteriorly between spaced radially extending flanges 68 and 69 to the intermediate pressure chamber 48 between the flanges 39 and 44. Flanges 68 and 69 cooperate respectively with chest flanges 39 and 44 to provide restricted intermediate passages 71 and 72 connecting the intermediate pressure chamber 48 with the lower pressure chamber 41 and the upper pressure chamber 46, respectively. Radial flange 69 is of somewhat greater diameter than flange 68, and, accordingly, passage 72 is smaller than passage 71.

Valve 65 is provided with a lower end face 73 and an upper end face 74 both of which are stepped primarily to lengthen the sleeve for the purpose of providing larger surfaces in contact with guide casing 51. These end faces make abutting contact in the end positions of the valve with the chest end flanges 38 and 43 to prevent the passage of air through restricted end passages 76 and 77 between the guide casing 51 and the valve chest. Passage 76 at the lower end of the valve mechanism opens directly into cylinder chamber 13 while passage 77 at the upper end opens into a circular channel 78 between member 51 and the valve chest part 36. Channel 78 is connected through a duct 79 to a vertical elongated compression chamber 81 extended in casing 9 parallel to cylinder chamber 13 and connected to the latter at its lower end below the piston 12.

As is illustrated most clearly in Figures 2, 3 and 4, a plurality of longitudinally extending compression chambers similar to chamber 81 are arcuately spaced around the circumference of the cylinder 9 and extend parallel to the cylinder chamber 13. With the exception of previously described chamber 81, however, these chambers bear the reference character 82 and are all closed at their upper ends, chamber 81 being the only chamber which connects to the circular channel 78. The compression chambers, in the manner of chamber 81, all open into the cylinder chamber 13 below the piston 12.

Cylinder chamber 13 is provided between its ends with a circumferential channel 86 opening to an exhaust outlet 84 in casing 9. With the piston 12 positioned below channel 86 exhaust port 84 is open, as illustrated in Figure 1, and the air under pressure within the chamber above the piston is free to escape. With the piston above the channel 86 any air under pressure below the piston is free to make its exit.

Another feature of interest comprises the lubricating means for the valve mechanism and the piston cylinder unit. A conduit 87 extends upwardly from channel 34 in the backhead 16 and intersects a horizontal channel 88, a wick 89 of material such as felt being located at the intersection. Forming an extension of duct 88 is an enlarged chamber 91 the threaded end of which is sealed by a closure cap 92. With the cap removed oil may be placed in chamber 91 but is prevented from flowing freely through ducts 88 and 87 by the wick 89. Pressure within the tool, and specifically within the channel 34 in the backhead, makes itself felt within the ducts 87 and 88 and in the chamber 91. Subsequently when the pressure is released within the tool the excess of pressure in the chamber 91 forces a certain amount of the lubricating oil through the wick 89 so that it passes downwardly through the duct 87 into channel 34 and thence into the valve mechanism from which it makes its way indirectly into the piston cylinder unit of the device.

In operation the tool would normally be held vertically as illustrated in Figure 1 although this is not necessarily the case. The air conduit 21 will be connected to a suitable source of air under pressure. When it is desired to perform a drilling operation the working end of the drill 7 is placed in contact with the work, the operator holding the handles 17 and depressing with the nearest hand the pivoted valve lever 28. The pivotal movement of that lever effects the displacement of valve 27 to open the port 26 whereupon air under pressure makes its way from the inlet conduit 21, through valve chamber 24, duct 26, and duct 33 into circular channel 34. From these it is conducted directly through the channels 61 into the central pressure chamber 52, formed by guide casing 51, from which it passes outwardly through the ports 63, channel 66 and ducts 67 in the valve 65, into the intermediate pressure chamber 48 formed by the valve chest between the central radially extending ribs or flanges 39 and 44.

With the tool held vertically the valve will be positioned as illustrated in Figure 1. The initial presence of the air under pressure within chamber 48 effects a rush of air through the restricted inner passages connecting that chamber with the upper and lower pressure chambers 46 and 41. Passage 72 connecting the upper chamber 46 with the intermediate chamber 48 is more restricted than the passage 71 connecting the lower chamber and, accordingly, the pressure in the lower chamber will build up more quickly thereupon exerting a displacing force against the underside of valve flange 68 which is greater than the opposing force exerted upon the upper side of flange 69. Thereupon the valve will be displaced upwardly, that is, toward the backhead 16, to close the upper passage 77 leading into the channel 78 and connected through it and the duct 79 to the pressure chamber 81.

The movement of the valve upwardly to close upper passage 77 results in the opening of lower passage 76, whereupon the air under pressure rushes into cylinder chamber 13, and the piston 12 is forced downwardly. In its downward movement, and after its lower end passes the channel 86, the air below the piston and within chamber 13 is compressed and forced into compression chambers 81 and 82 until finally the piston strikes hammer 11 and delivers the working blow through it to the drill proper 7. As the upper end of the piston passes channel 86 exhaust port 84 is opened and the air under pressure exerting downward force upon piston 12 is released.

At this time the pressure of the air compressed in compression chamber 81 exerted upon the upper end 74 of the valve 65 through the passage 77 is effective to force the valve downwardly from its position illustrated in Figure 4 to the position illustrated in Figure 1 in which position it closes lower passage 76 and cuts off the escape of air into the cylinder chamber 13 the upper end of which is now open to atmosphere through the exhaust port 84.

Upon the piston reaching the lower end of its stroke the pressure which has been built up within the pressure reservoirs or compression chambers 82 is effective to drive it upwardly. This force is supplemented by air under pressure which enters the lower end of cylinder chamber 13 from the compression chamber 81 which is now connected to the incoming air under pressure, the upper end passage 77 being open. In its upward travel it again closes the exhaust port 84 and thereafter compresses the air in the upper end of chamber 13 until it reaches the upper end of its stroke, illustrated in Figure 4.

As the lower end of the piston passes the channel 86 and exhaust port 84 pressure within compression chamber 81 is released and with it the force holding the valve 65 in its lowered position. As the piston 12 travels upwardly the pressure it builds up in the upper end of cylinder chamber 13 acting against the lower face 73 of valve 65 is effective to displace the latter from its position illustrated in Figure 1 to that illustrated in Figure 4. The intermediate pressure chamber 48 is again open to lower pressure chamber 41 and through passage 76 to the upper end of the cylinder chamber 13, and the piston 12 is again driven down at high speed as previously described.

This operation is repeated at high frequency as high as 20 times per second, and with each stroke of piston 12 valve 65 reverses its position. After its initial displacement to a position to direct air under pressure into the upper end of cylinder chamber 13, a movement effected by virtue of the cooperating contours of the valve and the valve chest, it is the pressure created by the piston 12 in its travel which effects valve displacement. The downward travel of the piston stores energy in the form of air under pressure in compression chamber 81 and this energy forces the valve 65 downwardly once the pressure within the upper end of cylinder chamber 13 has been released. Similarly, the upward travel of the piston builds up a pressure within the upper end of chamber 13 which effects the upward movement of the valve upon reaching a sufficiently high value and after the pressure in compression chamber 81 is released by the opening of the lower end of chamber 13 to atmosphere through exhaust port 84.

Valve 65 travels between end positions in which it seals the end passages 76 and 77 to control the direction of air flow. Its freedom of movement is aided by the unavoidable leakage of air which takes place between the channel 66 and its ends. The passage of this air provides, in effect, a fluid support for the valve on the guide structure and substantially reduces frictional losses.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a valve mechanism, a casing forming a central pressure chamber connected to a source of fluid under pressure and formed with laterally opening ports, a valve chest encircling said central pressure chamber in spaced relationship interiorly contoured to form an intermediate pressure chamber and upper and lower pressure chambers at the sides thereof, said chest being spaced from said casing to form ports leading from the exterior into said upper and lower chambers, and a sleeve valve slidably positioned between said casing and said chest for movement between sealing positions with respect to said ports and cooperating with said chest in forming said intermediate, upper and lower pressure chambers, said valve being formed with lateral ducts connecting said laterally opening ports of said central pressure chamber with said intermediate pressure chamber and being exteriorly contoured as to provide between itself and said chest restricted openings connecting said intermediate pressure chamber with said upper and lower chambers, said openings being of different sizes whereby fluid under pressure in said intermediate pressure chamber flows more freely into the chamber connected by the larger opening to effect the displacement of said valve to open the port leading into that chamber.

2. In a valve mechanism for pneumatic tools, a central cylindrical casing open at one end, closed at its opposite end, and formed with a laterally extending port in its side, a valve chest encircling said casing and formed with end flanges extending toward said casing to form restricted passages, and a sleeve valve slidingly enclosing said casing for movement thereon between end positions in each of which it contacts one of said end flanges and closes the restricted passage formed by the contacted flange and by said casing, said valve being formed with flanges extended toward the spaced enclosing chest to form therewith a central pressure chamber and end pressure chambers adjacent said end passages, each of said flanges on said valve forming with the enclosing chest an air passage connecting said central pressure chamber and an end pressure chamber, said valve also being provided with a laterally extending duct connecting the port in said casing with said central pressure chamber.

3. In a pneumatic tool of the type in which a piston is longitudinally slidable between end positions in the chamber of a cylinder provided with an exhaust outlet between its ends and interiorly connected at one end to a compression chamber, a valve mechanism connected to the opposite end of said cylinder chamber comprising an open-topped cylindrical casing forming a central pressure chamber connected to a source of air under pressure and having laterally extending ports in its sides, a cylindrical valve chest encircling said casing in spaced relationship to form a cavity having restricted passages at its ends, one of which opens into said cylinder chamber at the end spaced from the end connected to said compression chamber and the other of which connects to said compression chamber, and a reciprocating valve the ends of which are exposed through said passages to the pressures in said cylinder chamber and in the connected compression chamber, said valve being adapted to be displaced by said pressures to control the flow of air through said passages.

4. In a pneumatic tool of the type in which a piston is longitudinally slidable between end positions in the chamber of a cylinder provided with an exhaust outlet between its ends and connected at one end to a plurality of compression chambers, a valve mechanism connected to the opposite end of said cylinder chamber from said compression chambers and comprising a flanged open-topped cylindrical casing forming an enlarged central pressure chamber connected to a source of air under pressure and having laterally extending ports in its sides, a cylindrical valve chest encircling said casing in spaced relationship to form a cavity having restricted passages at its ends, one of which opens into said cylinder chamber and the other of which connects to one of said compression chambers, and a reciprocating valve slidingly enclosing said cylindrical casing, spaced from the encircling valve chest, and having laterally extending ducts connecting said laterally extending casing ports with the cavity formed by said chest, said valve in its end positions closing said passages and being exposed therethrough alternatively to the pressure of the cylinder chamber or the compression chamber connected thereto, and being adapted to be displaced by those pressures in the presence of a lesser opposing pressure.

5. In a pneumatic tool of the type in which a piston is longitudinally slidable between end positions in the chamber of a cylinder provided with an exhaust outlet between its ends and connected at one end to a plurality of compression chambers, a valve mechanism connected to the opposite end of said cylinder chamber from the connection of said compression chambers comprising a flanged open-topped cylindrical casing forming a central pressure chamber connected to a source of air under pressure and having laterally extending ports in its sides, a cylindrical valve chest encircling said casing in spaced relationship to form a cavity having restricted passages at its ends, one of which opens into said cylinder chamber and the other of which connects to one of said compression chambers, a reciprocating sleeve valve slidably seated on said central pressure chamber and formed with a laterally extending duct connecting said ports in said central pressure chamber to said cavity formed by said chest, the ends of said valve being exposed through said passages to the pressures in said cylinder chamber and in the connected pressure chamber and said valve being adapted to be displaced thereby, characterized in that the laterally extending ports in said central pressure chamber which open to the laterally extending duct in said valve comprise the sole escape of air under pressure from said central valve chamber and in that longitudinal leakage takes place longitudinally of said valve from said ports and between said valve and said pressure chamber to provide a reduced friction floating action for said valve.

HILMER A. GILLERSTROM.

REFERENCES CITED

The following references are of record in the file of this patent:

UNITED STATES PATENTS

| Number | Name | Date |
|---|---|---|
| 1,774,266 | Gustafson | Aug. 26, 1930 |
| 1,852,724 | Pearson | Apr. 5, 1932 |
| 1,855,240 | Hulshizer | Apr. 26, 1932 |
| 2,162,036 | Smith | June 13, 1939 |
| 2,252,711 | Gartin | Aug. 19, 1941 |
| 2,260,300 | Curtis | Oct. 28, 1941 |
| 2,369,714 | Carr | Feb. 20, 1945 |
| 2,415,521 | O'Farrell | Feb. 11, 1947 |